US012429660B2

United States Patent
Ali et al.

(10) Patent No.: US 12,429,660 B2
(45) Date of Patent: Sep. 30, 2025

(54) IMAGING DEVICE, AN IMAGING SYSTEM AND A METHOD FOR WAVELENGTH DEPENDENT IMAGING

(71) Applicants: IMEC VZW, Leuven (BE); Katholieke Universiteit Leuven, Leuven (BE)

(72) Inventors: Farhan Ali, Leuven (BE); Robert Gehlhaar, Herent (BE); Jan Genoe, Testelt (BE); Bruno Figeys, Heverlee (BE)

(73) Assignee: IMEC VZW, Leuven (BE)

( * ) Notice: Subject to any disclaimer, the term of this patent is extended or adjusted under 35 U.S.C. 154(b) by 105 days.

(21) Appl. No.: 18/392,354

(22) Filed: Dec. 21, 2023

(65) Prior Publication Data

US 2024/0210641 A1 Jun. 27, 2024

(30) Foreign Application Priority Data

Dec. 21, 2022 (EP) .................................. 22215329

(51) Int. Cl.
   *G02B 6/42* (2006.01)
   *H04N 23/11* (2023.01)
   *H04N 23/55* (2023.01)

(52) U.S. Cl.
   CPC ......... *G02B 6/4298* (2013.01); *G02B 6/4203* (2013.01); *H04N 23/11* (2023.01); *H04N 23/55* (2023.01)

(58) Field of Classification Search
   CPC .... G02B 6/4298; G02B 6/4203; H04N 23/11; H04N 23/55; G01J 3/0205; G01J 3/0208; G01J 3/0216
   See application file for complete search history.

(56) References Cited

U.S. PATENT DOCUMENTS

| 8,384,818 B2* | 2/2013 | Hiramoto | H10F 39/8053 |
| | | | 348/340 |
| 9,105,540 B2* | 8/2015 | Ikemoto | H10F 39/8067 |
| 2011/0249161 A1* | 10/2011 | Takagi | H10F 39/806 |
| | | | 348/294 |

FOREIGN PATENT DOCUMENTS

| EP | 3770660 A1 | 1/2021 |
| EP | 3944323 A1 | 1/2022 |

OTHER PUBLICATIONS

Extended European Search Report and Search Opinion, Application No. EP 22215329.8, mailed May 31, 2023, 6 pages.
Redding, Brandon, and Hui Cao. "Using a multimode fiber as a high-resolution, low-loss spectrometer." Optics letters 37, No. 16 (2012): 3384-3386.

(Continued)

*Primary Examiner* — Jason A Flohre
(74) *Attorney, Agent, or Firm* — McDonnell Boehnen Hulbert & Berghoff LLP

(57) ABSTRACT

The disclosure relates to an imaging device for wavelength dependent imaging. The imaging device includes a detector having a plurality of light sensitive elements, a plurality of light propagating units, each including: a funnel element for collecting light at a collecting end and propagate the light to a transmitting end; a waveguide for receiving light from the transmitting end at a receiving end and propagating light to a distributing end.

19 Claims, 8 Drawing Sheets

(56) References Cited

OTHER PUBLICATIONS

Nishiwaki, Seiji, Tatsuya Nakamura, and Masa-aki Suzuki. "Highly Sensitive Image Sensors Using Micro Color Splitters (Process technologies, 2nd Asian Image Sensors and Imaging Systems Symposium)." In ITE Technical Report 38.47, pp. 5-6. The Institute of Image Information and Television Engineers, 2014.

Shramkova, Oksana, Valter Drazic, Bobin Varghese, Laurent Blondé, and Valerie Allié. "Optical efficiency enhancement of nanojet-based dielectric double-material color splitters for image sensor applications." Nanomaterials 11, No. 11 (2021): 3036.

Onozawa, Kazutoshi, Kimiaki Toshikiyo, Takanori Yogo, Motonori Ishii, Kazuhiko Yamanaka, Toshinobu Matsuno, and Daisuke Ueda. "A MOS image sensor with a digital-microlens." IEEE transactions on electron devices 55, No. 4 (2008): 986-991.

* cited by examiner

IMAGING DEVICE, AN IMAGING SYSTEM AND A METHOD FOR WAVELENGTH DEPENDENT IMAGING

CROSS-REFERENCE TO RELATED APPLICATIONS

The present application is a non-provisional patent application claiming priority to European Patent Application No. EP 22215329.8, filed Dec. 21, 2022, the contents of which are hereby incorporated by reference.

FIELD OF THE DISCLOSURE

The present description relates to wavelength dependent imaging, and more specifically to an imaging device, and imaging system and a method for acquisition of wavelength dependent images.

BACKGROUND

Imaging techniques using detection of several different properties of light, such as different wavelengths and/or different types of polarizations, have found widespread application ranging from multi-spectral detection for scientific measurements and photographic imaging, to polarimetric detection enabling 3D sensing and improved object identification.

In order to distinguish between light of different properties, imaging devices such as digital cameras typically comprise filter arrays covering the pixels. For wavelength dependent imaging such as multi-spectral and hyper-spectral imaging, the filter arrays may comprise sets of different color filters to filter out certain wavelength bands, such that different pixels detect light intensity within different wavelength bands of the full light spectrum. A common example is cameras for photography comprising filter arrays for the colors red, green, and blue, allowing the three separate colors to be detected by respective pixels of the imaging detector. The acquired signals from the different pixels may be used to represent the intensity of the respective wavelength bands, and based on these measured intensities the wavelength composition of the incident light may be determined.

For polarimetric imaging, the filter arrays may comprise sets of different polarization filters to filter out certain polarization types, such that different pixels on the imaging device detect light intensity within different types of polarization. The acquired signals from the different pixels may be used to represent the intensity of the respective polarization types, and based on the measured intensities the polarization content of the incident light may be determined.

However, conventional filters reduce the intensity of the incident light before it reaches the detector, thereby effectively reducing the sensitivity of the imaging device. For example, conventional polarization filters may discard more than 50% of the incident light.

On the other hand, detector development is driven towards obtaining higher resolution images, and thus towards smaller pixel size. With decreasing pixel size, it is growing increasingly difficult to obtain good image quality, especially at low light conditions.

Hence, there is a need in the art for further improvements related to light sensitivity and thus to downscaling of imaging devices related to wavelength dependent imaging.

SUMMARY

The present description mitigates, alleviates and/or eliminates one or more of the above-identified deficiencies and disadvantages both individually and in any combination. These and other objectives are at least partly met by the present disclosure as specified in the independent claims.

According to one embodiment, an imaging device for wavelength dependent imaging is provided. The imaging device comprising:

a detector comprising a plurality of light sensitive elements, wherein each light sensitive element is configured to generate an electric signal dependent on an intensity of light incident onto the light sensitive element;

a plurality of light propagating units, wherein each light propagating unit of the plurality of the light propagating units comprises:

a funnel element having a collecting end and a transmitting end, and defining a central funnel axis extending from the collecting end to the transmitting end, the funnel element being configured to collect light incident at the collecting end and to propagate the light to the transmitting end, wherein a cross-section of the collecting end is larger than a cross-section of the transmitting end;

a waveguide having a receiving end and a distributing end, and defining a central waveguide axis extending from the receiving end to the distributing end, the waveguide being configured to receive the light from the transmitting end at the receiving end and to propagate the light to the distributing end, wherein the waveguide is a multimode waveguide configured to propagate the light through the waveguide in dependence of wavelength such that a spatial distribution of the light at the distributing end is dependent on wavelength of the light;

wherein for a first light propagating unit the funnel element and the waveguide have a first asymmetric coupling such that the central funnel axis at the transmitting end has a first displacement with respect to the central waveguide axis at the receiving end, and for a second light propagating unit the funnel element and the waveguide have a second asymmetric coupling such that the central funnel axis at the transmitting end has a second displacement with respect to the central waveguide axis at the receiving end, wherein the second displacement is different from the first displacement;

wherein, for each light propagating unit, the light propagating unit is arranged with respect to the detector such that the light at the distributing end is incident onto at least two light sensitive elements of the plurality of light sensitive elements.

As utilized herein, the term "wavelength dependent imaging" specifies the detection of light such that for each of a plurality of spatial positions on an imaged object or scene, information related to the wavelength of the light from the corresponding spatial position is detected.

In this context the term "light" should be allowed a broad interpretation, not limited to visible electromagnetic radiation. Rather, the term "light" may also include for example ultraviolet light, infrared light, or combinations thereof.

As utilized herein, the term "light sensitive element" specifies an element reacting to light impinging onto the element, by generating an electric signal as a response to the light intensity. A plurality of light sensitive elements may be arranged on a detector, configured to allow read-out of the electric signals representing light for image acquisition. Given as non-limiting examples, light sensitive elements may be found on photodiodes, photo-multiplier tubes (PMT), and pixels on image detectors such as charge-coupled devices (CCD) and complementary metal oxide semiconductors (CMOS). By way of example, a plurality of light sensitive elements may be in the form of pixels on a CCD or CMOS detector, but may alternatively comprise a plurality of any other type of light sensitive elements.

By way of example, the plurality of light sensitive elements may be arranged in a plane of the detector. By way of further example, the plane may be a planar surface of the detector.

According to an embodiment, the plurality of light sensitive elements is arranged in rows and columns forming an array of light sensitive elements. Thus, the plurality of light sensitive elements may be arranged in a regular manner. This may facilitate manufacturing of the detector.

Typically, a light sensitive element is in the shape of a square, however it is conceivable that the light sensitive element may alternatively be of another shape, such as a rectangular, circular, or elliptical shape.

However, it should be understood that the plurality of light sensitive elements need not be arranged in a regular manner and that different light sensitive elements may have different sizes and/or shapes.

As utilized herein, the term "light propagating unit" specifies any unit, device, and/or element with the capability of propagating light based on the wavelength of the light.

Given only as an example, incident light of several wavelengths may be propagated through the light propagating unit such that different wavelengths are provided with different spatial distribution of intensity, by having a direction of propagation altered based on the wavelength of the light, such that different wavelengths take different directions. By the present arrangement, different wavelengths may reach different locations of the distributing end. It should, however, be realized that the light propagating unit may not necessarily completely separate different wavelengths in different directions. Rather, the light propagating unit may provide a spatial distribution of light in a cross-section of the light propagating unit (such as at the distributing end), wherein the spatial distribution of light is different for different wavelengths. However, it is conceivable that incident light of several wavelengths may, alternatively, be fully separated by having a direction of propagation altered based on the wavelength of the light, such that different wavelengths take different directions.

The light propagating unit comprises a funnel element having a collecting end and a transmitting end. The funnel element is configured to collect light incident at the collecting end and to propagate the collected light to the transmitting end. In order for the collecting end to collect as much light as possible, the cross-section of the collecting end is large. The funnel element is tapered such that the cross-section of the collecting end is larger than the cross-section of the transmitting end. By way of example, the funnel element may be tapered such that the light may be confined to a very small area at the transmitting end having a size in the same order of magnitude as the wavelength of the light. By way of example, the transmitting end may have a width in the range of 400 nm to 600 nm. By way of further example, a width of the collecting end may around 1.5 µm, such as 1.4 µm or 1.3 µm.

The light propagating unit further comprises a waveguide having a receiving end and a distributing end. The waveguide is configured to receive the light from the transmitting end of the funnel element at the receiving end of the waveguide. The waveguide may have a cross-section at the receiving end that is smaller than the cross-section of the collecting end of the funnel element. Thus, in order for all light collected at the collecting end to be coupled into the waveguide, the funnel element is tapered such that the transmitting end of the funnel element has a cross-section that is not larger than the cross-section of the receiving end of the waveguide. Typically, the funnel element is tapered such that the transmitting end of the funnel element has a cross-section that is smaller than the cross-section of the receiving end of the waveguide. By the present arrangement, an efficient stacking of the elements facilitating coupling most of the light, and preferably all the light, into the respective light sensitive elements of the detector may be provided.

The receiving end may be facing the transmitting end. The receiving end may be in direct physical contact with the transmitting end. In another example, a gap may be formed between the receiving end and the transmitting end. In yet another example, the light propagating unit may be made of a single piece of material such that the funnel element and the waveguide are different portions of the single piece.

By way of example, one or more additional layers may be provided between the transmitting end and the receiving end. By way of example, the one or more additional layers may enhance the coupling of light between the funnel element and the waveguide.

The waveguide is further configured to propagate the light from the receiving end to the distributing end. The waveguide may be, but is not required to be, tapered from the receiving end to the distributing end such that a cross-section of the receiving end is larger than a cross-section of the distributing end. In another example, the sides of the waveguide may be parallel. As the waveguide is a multi-mode waveguide, the waveguide will propagate the light through the waveguide in dependence of wavelength. In this manner, the distribution of the light at the distributing end is dependent on the wavelength content of the light.

Each light propagating unit is arranged with respect to the detector such that the light at the distributing end is incident onto at least two light sensitive elements of the array of light sensitive elements.

Each of the light sensitive elements in combination with a light propagation unit may be arranged to capture light of at least one specific wavelength band. By using at least two light sensitive elements, detection of at least two different wavelength bands may be provided. The incident light may thus be distributed by the propagation through the waveguide being wavelength dependent, such that different wavelengths are differently distributed in relation to the light sensitive elements on the detector.

By way of example, the light propagating unit may be made of a material with a refractive index higher than a refractive index of a surrounding medium. Given as a non-limiting example, the light propagating unit may be made of Silicon Nitride with a refractive index of about 2.0. The surrounding medium may be made of an Oxide with a lower refractive index. By the present arrangement, absorption of light in the light propagating unit may be avoided. Thus, most of the light, and preferably all the light, collected at the collecting end of the funnel element may be asymmetrically coupled to the receiving end of the waveguide. Multimode interference in the waveguide leads to a wavelength dependent beating of the light, resulting in spatial distribution of the light at different locations of the distributing end dependent on wavelength of the light. By the present arrangement, substantially all light collected at the collecting end is propagated through the funnel element to the transmitting end and coupled into the waveguide, such that substantially all light collected will be distributed through the distributing end and will be incident onto a light sensitive element of the detector.

It should be understood that the term "all light" is here referring to all the light withing the wavelength range for which the imaging device and the light propagating units are designed to function. By way of example, the imaging device and the light propagating units may be designed to work for light within the wavelength range of 400-700 nm. Incident light outside the working wavelength range may not necessarily be collected and guided into the funnel element. For example, such light may alternatively be reflected, absorbed or scattered by the light propagating units.

As mentioned above, the plurality of light sensitive elements may be arranged in a plane of the detector. Further, the plane may be a planar surface of the detector. Each light propagating unit of the plurality of the light propagating units may extend in a direction substantially perpendicular to the plane. More specifically, an optical axis through the light propagating unit, corresponding to the main direction of light propagation may extend substantially perpendicular to the plane of light sensitive elements. The light propagating units may be arranged such that the collecting end of the funnel element is facing away from the detector, and such that the transmitting end of the funnel element is facing towards the detector. At the transmitting end of the funnel element, the waveguide may be arranged such that the receiving end faces away from the detector and thus facing the transmitting end of the funnel element. Further, the distributing end of the waveguide may be facing the plurality of light sensitive elements of the detector.

By way of example, the waveguide and the detector may be arranged such that a gap is formed between the distributing end and the light sensitive elements, or the distributing end and the light sensitive elements may be arranged to be in direct physical contact with each other. In some embodiments, one or more additional layers may be provided between the distributing end and the light sensitive elements. By way of example, the one or more additional layers may enhance the coupling of light between the waveguide and the detector.

The material of which the funnel element and/or waveguide of the light propagating unit is made of may depend on the wavelength range for which the light propagating unit is designed. Given as non-limiting examples, if the light propagating unit is designed for propagation of visible light, materials such as $SiN$, $TiO_x$, or $NbO_x$ may be used in a $SiO_x$ environment. Given as further non-limiting examples, if the light propagating unit is designed for propagation of light in the near infrared (NIR) range, materials such as amorphous Si, or Carbon rich amorphous silicon may be used.

A funnel element and a waveguide may be asymmetrically coupled. In other words, the central axis of the funnel element at the transmitting end may be displaced with respect to the central axis of the waveguide at the receiving end. Thus, the displacement may be defined in a plane of the receiving end. By way of example, the central axis of the funnel element may be parallel to the central axis of the waveguide.

It serves to mention that "the central axis of the funnel element at the transmitting end" is a point in space located in a plane of the transmitting end. Similarly, "the central axis of the waveguide at the receiving end" is a point in space located in the plane of the receiving end.

It should be understood that in case the funnel element and the waveguide are arranged such that the transmitting end and the receiving end are in direct physical contact with each other, or if the transmitting end and the receiving end are close to each other, the plane of the transmitting end and the plane of the receiving end may be considered to substantially coincide to form a common plane. The common plane may interchangeably be referred to as the plane of the receiving end and the plane of the transmitting end. Thus, the displacement between the central axis of the funnel element at the transmitting end with respect to the central axis of the waveguide at the receiving end may be a displacement in the plane of the receiving end.

Further, it should be understood that in case the funnel element and the waveguide are arranged such that the transmitting end and the receiving end are spaced apart, the plane of the transmitting end and the plane of the receiving end may not coincide, but may rather form two separate planes. A displacement in the plane of the receiving end may in such case be defined by the distance between the central axis of the waveguide at the receiving end and the perpendicular projection of the central axis of the funnel element at the transmitting end onto the plane of the receiving end.

The plurality of light propagating units may be arranged across the detector to collect incident light and to propagate the collected light to the plurality of light sensitive elements of the detector. It should be realized that light incident towards different parts of the detector may have different angles of incidence. For example, in case a conventional objective lens is used to collect light to project an image of a scene onto the plurality of light propagating units of the imaging device, light may be incident at or close to a normal incidence onto light propagating units arranged at central portion of the detector, whereas light may be incident at a greater angle with respect to the normal onto light propagating units arranged at a peripheral portion of the detector.

For a light propagating unit receiving light at normal incidence to a plane of the collecting end of the funnel element, and thus perpendicular to the plane of the collecting end, a certain displacement is preferred between the central axis of the funnel element at the transmitting end and the central axis of the waveguide at the receiving end. A displacement, and thus an asymmetric coupling, may provide a desired light distribution property of the light propagating unit. The preferred displacement may be dependent on the size/width of the transmitting end of the funnel element. Given as a non-limiting example, the transmitting end may have a width in the range of 400 nm to 600 nm. Typically a preferred displacement may be 90 nm in one direction in the plane of the receiving end.

By way of example, the preferred displacement for a light propagating unit receiving light at a normal incidence may be the first displacement.

For a light propagating unit receiving light not at normal incidence to the plane of the collecting end of the funnel element, but is instead incident with an angle of incidence with respect to the normal, a different displacement may be required in order to provide the same, or similar, light distribution property of the light propagating unit, as for a light propagating unit receiving light at normal incidence. By way of example, the preferred displacement for a light propagating unit receiving light at an angle of incidence with respect to the normal may be the second displacement. Given as a non-limiting example, the second displacement may be smaller than the first displacement.

Thus, the imaging device may be configured such that different locations on the detector may be provided with light propagating units having different asymmetric coupling of the funnel element to the waveguide, wherein the asymmetric coupling for each respective location is selected based on an expected angle of incidence of the light at the respective location, so as to enable compensation of propagation of the light in each waveguide for the angle of incidence. Put differently, the imaging device may be configured to receive light incident with a different angle of incidence onto different light propagating units of the plurality of light propagating units, depending on a location on the detector of the different light propagating units, wherein the different light propagating units are arranged with different asymmetric coupling of the funnel element to the waveguide depending on the location on the detector of the different light propagating units, so as to compensate propagation of the light in each waveguide for the angle of incidence.

It serves to mention that different light propagating units, such as the first light propagating unit and the second light propagating unit, may be different in that they have different asymmetric coupling of the funnel element to the waveguide. However, different light propagating units may have funnel elements of the same type. Further, different light propagating units may have waveguides of the same type.

By way of example, the first light propagating unit may be arranged at a location on the detector at which light at normal incidence is expected, and the second light propagating unit may be arranged at a location on the detector at which light at a greater angle of incidence with respect to the normal is expected.

It serves to mention that not all light propagating units of the plurality of light propagating units necessarily have to have an asymmetric coupling. Some of the light propagating units of the plurality of light propagating units may have a symmetric coupling, such that a displacement between the funnel element and the waveguide may be small or zero. It is conceivable that, for certain angles of incidence, a symmetric coupling may be required in order to provide an efficient transmission and light distribution performance.

In one embodiment, an imaging device for wavelength dependent, or multispectral/hyperspectral, imaging may be provided. As utilized herein, the term "multispectral imaging" specifies imaging detecting image data within at least two, and typically more than two, specific spaced wavelength bands across the electromagnetic spectrum, for each picture element. As utilized herein, the term "hyperspectral imaging" specifies imaging detecting image data within at least two, and typically more than two, specific continuous wavelength bands across the electromagnetic spectrum, for each picture element. Multispectral/hyperspectral imaging may be used in order to identify a characteristic spectral fingerprint of different portions of an imaged object.

In another embodiment, an imaging device for wavelength dependent imaging may be provided without using conventional wavelength filters. By using wavelength filters a relatively large portion, such as 50-70%, of the collected light may be discarded and will thus not reach the detector, since only a specific wavelength range will be transmitted. By the imaging device of the first aspect, most, or preferably all of the collected light may reach the detector, since light is not filtered out of the optical path, but rather redistributed and/or split into different paths based on wavelength. Thus, an imaging device with a higher detection efficiency and improved performance also at low light conditions may be provided.

In another embodiment that utilizes the disclosed combination of the funnel element and the waveguide, the amount of collected light may be increased. Thus a light collection and separation arrangement with low light losses may be provided. This may in turn increase sensitivity of the imaging device, and improved quality of the detected data may be provided.

In another embodiment, the imaging device allows for improved light propagation efficiency and distribution/splitting performance also at large angles of incidence. Typically, imaging devices are designed for receiving light at normal incidence or within a narrow range of angle of incidence with respect to the normal, such as ±10°. However, part of the detector may receive light at other angles of incidence, for example at oblique incidence, at which propagation efficiency and splitting performance may be reduced. However, by the present arrangement, the light propagation may be compensated for different angles of incidence, by providing light propagating units with different asymmetric coupling depending on the location of the respective light propagating unit on the detector. In the manner described above, an imaging device for wavelength dependent imaging with a more uniform sensitivity and light distributing performance across the detector may be provided.

According to an embodiment, for each light propagating unit, the waveguide is configured to propagate the light through the waveguide in dependence of wavelength such that the light at the distributing end is distributed into at least two wavelength bands linearly distributed along the distributing end, and wherein each of the at least two wavelength bands is associated with a mutually unique light sensitive element of the at least two light sensitive elements.

The at least two wavelength bands may be overlapping and/or adjacent with respect to each other. By "overlapping" wavelength bands is here meant that the at least two wavelength bands have an at least partially common spectral range. By "adjacent" wavelength bands is here meant that the at least two wavelength bands defined by the light propagating unit does not have a wavelength gap in-between the at least two wavelength bands.

The light collected by the funnel element and propagated through the waveguide towards the respective light sensitive elements of the detector may be distributed by the waveguide. However, no substantial light absorption occurs, thus no light is lost. The distribution is dependent on wavelength of the light and provides a set of bands in a pattern at the distributing end. Thus, the pattern is a result of the distribution of the light in the waveguide. By the present arrangement, the light may be distributed or split into two or more wavelength bands of the incoming light into a pattern. Each wavelength band may have high transmission for some wavelengths and low transmission for other wavelengths, respectively. The light in the respective wavelength bands may subsequently be detected by the respective light sensitive elements of the detector.

In another embodiment configured as disclosed, it is possible to discriminate between different wavelengths bands without using color filters for controlling the wavelengths reaching the light sensitive elements, thereby not losing a significant portion of the incident light before it reaches the detector.

According to an embodiment, for each light propagating unit, the at least two light sensitive elements onto which the light at the distributing end is incident form a sub-set of light sensitive elements, such that the plurality of light sensitive elements is divided into a plurality of sub-sets of light sensitive elements.

Each sub-set of light sensitive elements may represent a picture element, such that each sub-set respectively corresponds to a spatial position on an imaged scene, and wherein each picture element comprises information related to the wavelength of the light from the corresponding spatial position. By way of a non-limiting example, if the wavelength bands correspond to red, green, and blue light, each respective sub-set may thus be used to represent the color information of the corresponding picture element. In this manner, detection of the light intensities incident onto the plurality of sub-sets may provide information representing a color image of the imaged scene.

According to an embodiment, for each light propagating unit, the wavelength bands are ordered along the distributing end in a descending manner with respect to wavelength.

It should be understood that a light propagating unit with the wavelength bands ordered along the distributing end in an ascending manner with respect to wavelength is equivalent to a light propagating unit with the wavelength bands ordered along the distributing end in a descending manner with respect to wavelength, which orientation has been turned by 180°.

According to the disclosed embodiments, it may be easier to define the sub-sets of light sensitive elements associated with the associated wavelength bands. By way of example, the present arrangement may be useful when the sub-sets are used for color representation in color images, since a more accurate color representation may be achieved.

According to an embodiment, the plurality of light sensitive elements is arranged in a planar fashion in a detector plane,
wherein the collecting ends of the funnel elements of all light propagating units of the plurality of light propagating units are arranged in a common plane parallel to the detector plane, and
wherein, for each light propagating unit, the central funnel axis is arranged to be perpendicular to the detector plane.

According to an embodiment, the plurality of light propagating units is arranged in at least a central zone arranged at a central portion of the detector, and a peripheral zone arranged at a peripheral portion of the detector,
wherein, for light propagating units arranged in the central zone, the funnel element and the waveguide have the first asymmetric coupling, and for light propagating units arranged in the peripheral zone, the funnel element and the waveguide have the second asymmetric coupling.

It is conceivable that the angle of incidence of light may be different in the central portion of the detector as compared to the peripheral portion of the detector. In such a case light propagating units with the first asymmetric coupling arranged in the central zone and light propagating units with the second asymmetric coupling arranged in the peripheral zone allow for different asymmetric coupling in the central zone and the peripheral zone, respectively.

The disclosed embodiment provides the device with good light propagation efficiency and distribution performance at large differences in angles of incidence between the central portion and the peripheral portion of the detector. The light propagation may be compensated for different angles of incidence, by providing light propagating units with different asymmetric coupling for the central and peripheral portions of the detector. By the present arrangement, a device for wavelength dependent imaging with a more uniform sensitivity and light distributing performance across the detector may be provided.

Within the central zone, all of the light propagating units may have a common first asymmetric coupling. Similarly, within the peripheral zone, all of the light propagating units may have a common second asymmetric coupling. This may facilitate manufacturing of the imaging device, since plural light propagating units may be provided with identical asymmetric coupling. However, within a zone, angles of incidence may vary but the variations in angles of incidence may be small. Small variations in angles of incidence may result in slight differences of light distribution property of the different light propagating units within a zone, however, these slight differences may not affect the performance significantly. Thanks to the central zone and peripheral zone being provided, light propagation may be compensated for a large difference of angles of incidence of central zone compared to the peripheral zone.

According to an embodiment, the first displacement is larger than the second displacement.

By way of example, a conventional objective lens used to project an image of a scene onto the plurality of light propagating units of the imaging device may provide light incident at or close to a normal incidence onto light propagating units arranged at central portion of the detector, and light incident at a greater angle with respect to the normal onto light propagating units arranged at a peripheral portion of the detector.

The disclosed embodiment provide for light propagation compensation at larger angles of incidence at the peripheral portion of the detector as compared to at the central portion of the detector, which is common when using a conventional objective lens. By the present arrangement, an imaging device for wavelength dependent imaging with a more uniform sensitivity and light distributing performance across the detector may be provided.

According to an embodiment, the plurality of light propagating units is further arranged in one or more intermediate zones arranged between the central zone and the peripheral zone; and
wherein, for light propagating units arranged in the central zone, the one or more intermediate zones and the peripheral zone, a size of a displacement of the central funnel axis at the transmitting end with respect to the central waveguide axis at the receiving end gradually transitions from the first displacement for light propagating units arranged in the central zone towards the second displacement for light propagating units arranged in the peripheral zone with decreasing size of the displacement from the central zone, through the one or more intermediate zones towards the peripheral zone.

It is conceivable that the angle of incidence of light gradually changes from the central portion of the detector to the peripheral portion of the detector. By way of example, the angle of incidence of light may gradually increase from normal incidence at the central portion of the detector towards a greater angle of incidence with respect to the normal at the peripheral portion of the detector.

Disclosed embodiments provide for improved compensation across gradually varying angles of incidence across the detector may be provided. By the present arrangement, an imaging device for wavelength dependent imaging with a more uniform sensitivity and light distributing performance across the detector may be provided.

According to an embodiment, the plurality of light propagating units is arranged to present a symmetry axis such that an asymmetric coupling of the light propagating units on a first side of the symmetry axis, is configured to be mirrored with respect to an asymmetric coupling of the light propagating units on a second side of the symmetry axis, the second side being opposite to the first side with respect to the symmetry axis.

As utilized, the term "mirrored" specifies that, at a given distance from the symmetry axis, the displacement of the central funnel axis at the transmitting end with respect to the central waveguide axis at the receiving end for a light propagating unit on the second side of the symmetry axis is equally large as for a corresponding light propagating unit on the first side of the symmetry axis, however displaced in an opposite direction in the plane of the receiving end. Put differently, the asymmetric coupling of a light propagating unit on the second side of the symmetry axis is the same as for a light propagating unit on the first side, but displaced in the opposite direction.

It is conceivable that if the asymmetric coupling is mirrored, the distribution of light as provided by the respective waveguides in dependence of wavelength may be mirrored as well, and therefore the wavelength dependence of the distribution may have opposite directions.

In disclosed embodiments, compensation for the angle of incidence at the first and second sides of the peripheral portion of the detector may be provided. The angle of incidence may have opposite directions on opposite sides of the symmetry axis. Thus, mirrored asymmetric coupling may enable similar compensation for the difference in direction of the angle of incidence at the first side and the second side, respectively.

According to an embodiment, for each light propagating unit, the waveguide is further configured to propagate the light through the waveguide in dependence of polarization such that a spatial distribution of the light at the distributing end is dependent on wavelength and polarization of the light.

As the waveguide is a multimode waveguide, the waveguide may propagate the light through the waveguide in dependence of polarization in addition to wavelength. Given only as an example, incident light of several types of polarization may be separated or spatially distributed by having a direction of propagation altered based on the polarization of the light, such that different types of polarization take different directions. In this manner, the distribution of the light at the distributing end is dependent on polarization as well as wavelength of the light.

In an example embodiment, an imaging device for combined wavelength dependent and polarization dependent, or polarimetric, imaging may be provided without using conventional polarization filters. By using polarization filters, a relatively large portion of the collected light may be discarded, since only a specific polarization will be transmitted. By this embodiment, most, or preferably all of the collected light may reach the detector, since light is not filtered out of the optical path, but rather redistributed and/or split into different paths based on polarization.

According to a second embodiment there is provided an imaging system comprising:
an imaging device according to the first aspect;
an objective lens configured to project an image of a scene onto the plurality of light propagating units of the imaging device, wherein light from the scene is incident with a different angle of incidence onto different light propagating units of the plurality of light propagating units, depending on a location on the detector of the different light propagating units in relation to the objective lens;
wherein the different light propagating units are arranged with different asymmetric coupling of the funnel element to the waveguide depending on the location on the detector of the different light propagating units, so as to compensate propagation of the light in each waveguide for the angle of incidence.

For the objective lens of the imaging system, the resulting angle of incidence onto the collecting ends of the plurality of light propagating units may be known. The plurality of light propagating units may thus be arranged such that each respective light propagating unit has an asymmetric coupling configured to compensate the propagation of the light through the waveguide for the respective angle of incidence of the light expected to reach the collecting end of the respective light propagating unit, and thereby providing substantially the same wavelength dependence for propagation of the light through all light propagating units of the plurality of light propagating units.

The disclosed second embodiment provides for improved light propagation efficiency and distribution performance across the detector despite the different angles of incidence at different portions of the detector. By the present arrangement, the light propagation may be compensated for different angles of incidence resulting from the objective lens, by providing light propagating units with different asymmetric coupling depending on the location of the respective light propagating unit on the detector. In the manner described above, an imaging system for wavelength dependent imaging with a more uniform sensitivity and light distributing performance across the detector may be provided.

According to a third embodiment, there is provided a method for wavelength dependent imaging, the method comprising:
collecting, by a plurality of light propagating units, light incident at a collecting end of a respective funnel element of each light propagating unit of the plurality of light propagating units;
propagating, for each light propagation unit, the light to a transmitting end of the funnel element, wherein a cross-section of the collecting end is larger than a cross-section of the transmitting end, and wherein the funnel element defines a central funnel axis extending from the collecting end to the transmitting end;
receiving, at a receiving end of a waveguide of each light propagating unit, the light from the transmitting end;
propagating, for each light propagation unit, the light to a distributing end of the waveguide, wherein the waveguide is a multimode waveguide, and wherein the propagating the light through the waveguide is dependent on wavelength such that a spatial distribution of the light at the distributing end is dependent on wavelength of the light, and wherein the waveguide defines a central waveguide axis extending from the receiving end to the distributing end;
wherein for a first light propagating unit the funnel element and the waveguide have a first asymmetric coupling such that the central funnel axis at the transmitting end has a first displacement with respect to the central waveguide axis at the receiving end, and for a second light propagating unit the funnel element and the waveguide have a second asymmetric coupling such that the central funnel axis at the transmitting end has a second displacement with respect to the central waveguide axis at the receiving end, wherein the second displacement is different from the first displacement, and
detecting, for each light propagating unit, the light at the distributing end, by at least two light sensitive elements of a plurality of light sensitive elements, such that each light sensitive element generates an electric signal dependent on an intensity of light incident onto the light sensitive element.

According to an embodiment, different light propagating units receive light of different angle of incidence and are arranged with different asymmetric coupling of the funnel element to the waveguide, such that for a first light propagating unit the funnel element and the waveguide have a first asymmetric coupling such that the central funnel axis at the transmitting end has a first displacement with respect to the central waveguide axis at the receiving end, and for a second light propagating unit the funnel element and the waveguide have a second asymmetric coupling such that the central funnel axis at the transmitting end has a second displacement with respect to the central waveguide axis at the receiving end, wherein the second displacement is different from the first displacement so as to compensate propagation of the light in each waveguide for the angle of incidence.

According to an embodiment, the propagating the light to a distributing end further comprises distributing the light into at least two wavelength bands linearly distributed along the distributing end, wherein each of the at least two wavelength bands is associated with a mutually unique light sensitive element of the at least two light sensitive elements.

According to an embodiment, the plurality of light propagating units comprises at least a central zone arranged at a central portion of the detector, and a peripheral zone arranged at a peripheral portion of the detector, and wherein, for light propagating units of the central zone, the funnel element and the waveguide are asymmetrically coupled.

Effects and features of the second embodiment are largely analogous to those described above in connection with the first aspect. Embodiments mentioned in relation to the first aspect are largely compatible with the second aspect. It is further noted that the inventive concepts relate to all possible combinations of features unless explicitly stated otherwise.

Other objectives, and features of the present disclosure will appear from the following detailed disclosure, from the attached claims as well as from the drawings.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present disclosure are described thereinafter according to a preferable embodiment, being not used to limit the claimed scope. This disclosure may be embodied in many different forms and should not be construed as limited to the embodiments set forth herein; rather, these embodiments are provided for thoroughness and completeness, and fully convey the scope of the inventive concept to the skilled person.

Figure 1A:
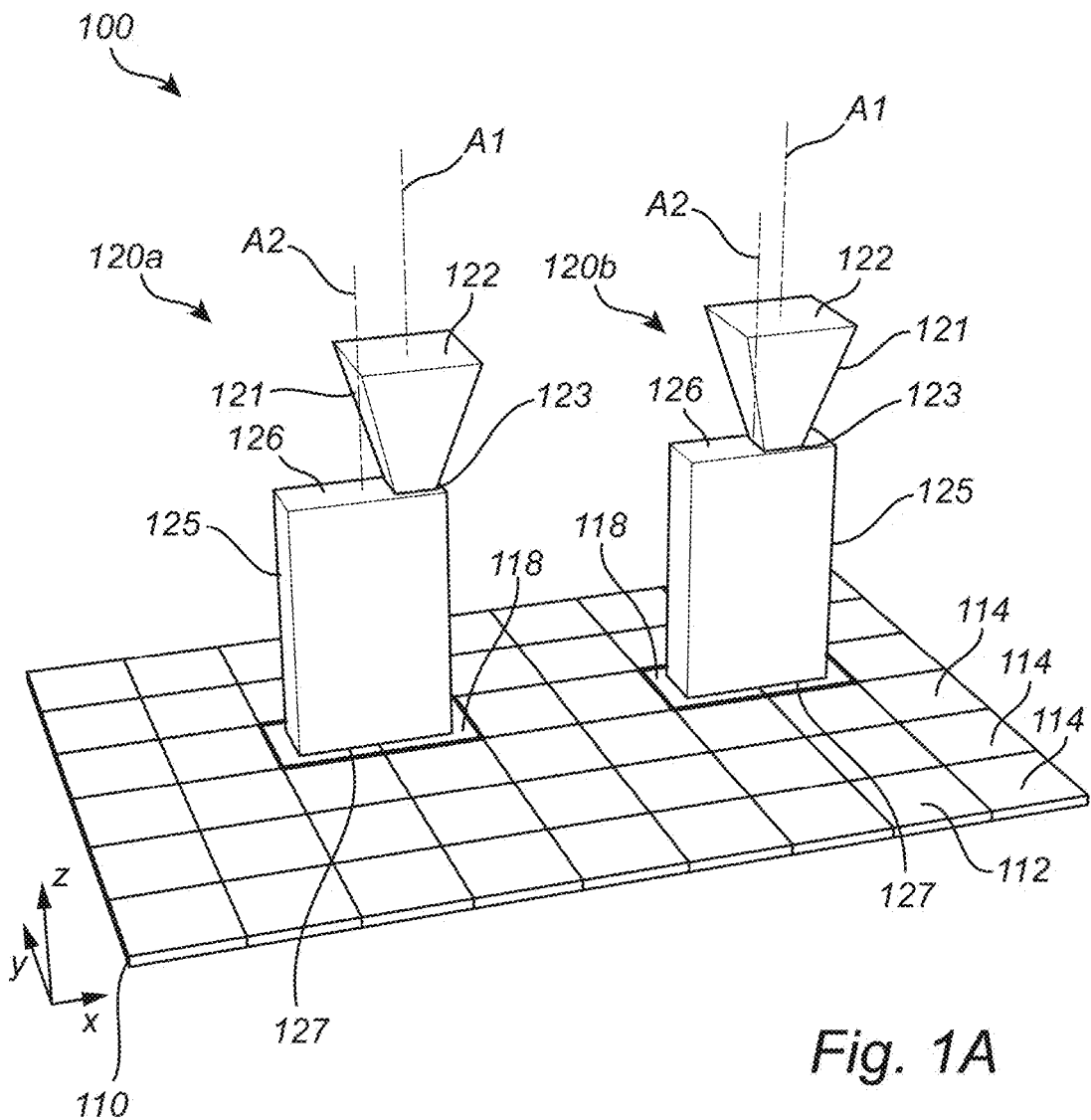
FIG. 1A illustrates an imaging device for wavelength dependent imaging according to an example embodiment.

FIG. 1A illustrates an imaging device 100 for wavelength dependent imaging.

The imaging device 100 comprises a plurality of light propagating units 120a, 120b. The light propagating units 120a, 120b are of at least two different types, i.e. a first type and a second type, such that the plurality of light propagating units comprises at least a first light propagating unit 120a and a second light propagating unit 120b. It is conceivable that the imaging device 100 comprises more than one light propagating unit 120a, 120b of each type, however, in FIG. 1A only one light propagating unit 120a, 120b of each type is illustrated simplicity and brevity.

Each respective light propagating unit 120a, 120b of the imaging device 100 comprises a funnel element 121 having a collecting end 122 and an opposite transmitting end 123. Each funnel element 121 defines a central funnel axis A1 extending from the collecting end 122 to the transmitting end 123. The collecting ends 122 of the plurality of light propagating units 120a, 120b are arranged adjacent to each other leaving only small gaps, or no gaps, in between the different collecting ends 122. The collecting ends 122 are here illustrated to be arranged in perpendicular rows and columns such that the collecting ends 122 together form a planar surface. However, it is conceivable that the collecting ends 122 may be arranged in alternative manners.

Each respective funnel element 121 is configured to collect light incident at the collecting end 122. The light may come from a scene being imaged by an objective lens (not shown here) onto the planar surface of collecting ends 122, however also other arrangements directing light onto the collecting ends 122 are conceivable.

The funnel element 121 is further configured to propagate the light from the collecting end 122 to the transmitting end 123. As illustrated in FIG. 1A, the funnel element 121 is tapered such that the cross-section of the collecting end 122 is larger than the cross-section of the transmitting end 123.

Each respective light propagating units 120a, 120b of the imaging device 100 comprises a waveguide 125 having a receiving end 126 and an opposite distributing end 127. Each waveguide 125 defines a central waveguide axis A2 extending from the receiving end 126 to the distributing end 127. The waveguide 125 is arranged such that the receiving end 126 is facing the transmitting end 123 of the funnel element 121. The waveguide 125 may be arranged such that the receiving end 126 is in direct contact with the transmitting end 123 of the funnel element 121. Alternatively, the waveguide 125 may be arranged such that a gap is formed between the receiving end 126 and the transmitting end 123.

The waveguide 125 is configured to receive the light from the transmitting end 123 at the receiving end 126. Most of the light, and preferably all the light, collected at the collecting end 122 of the funnel element 121 may be propagated to the transmitting end 123 and coupled into the waveguide 125 via the receiving end 126.

Optionally, one or more additional layers may be provided between transmitting end 123 and the receiving end 126. The one or more additional layers may enhance the coupling of light between the funnel element 121 and the waveguide 125.

For each of the first light propagating unit 120a and the second light propagating unit 120b, the funnel element 121 and the waveguide 125 are asymmetrically coupled. More specifically the transmitting end 123 is coupled to the receiving end 126 such that the central funnel axis A1 at the transmitting end 123 is displaced with respect to the central waveguide axis A2 at the receiving end 126. It should be realized that, for the first light propagating unit 120a the funnel element 121 and the waveguide 125 have a first asymmetric coupling such that the central funnel axis A1 at the transmitting end 123 has a first displacement with respect to the central waveguide axis A2 at the receiving end 126, and for the second light propagating unit 120b the funnel element 121 and the waveguide 125 have a second asymmetric coupling such that the central funnel axis A1 at the transmitting end 123 has a second displacement with respect to the central waveguide axis A2 at the receiving end 126. Thus, the second displacement is different from the first displacement, such that the first light propagating unit 120a and the second light propagating unit 120b have different asymmetric coupling.

The waveguide 125 is further configured to propagate the light to the distributing end 127. The waveguide 125 is a multimode waveguide configured to propagate the light through the waveguide 125 in dependence of wavelength. By the present arrangement the spatial distribution of the light at the distributing end 127 is dependent on wavelength of the light. At the distributing end 127 the light may exit the waveguide 125.

The imaging device 100 further comprises a detector 110 comprising a plurality of light sensitive elements 114 which here form an array 112 of light sensitive elements 114. The light sensitive elements 114 are arranged in a planar fashion in a detector plane. Although the light sensitive elements 114 are here illustrated to be arranged in perpendicular rows and columns of an array 112, it is conceivable that the light sensitive elements 114 may alternatively be arranged in other manners.

Each respective light propagating unit 120a, 120b is arranged with respect to the detector 110 such that the distributing end 127 is facing the array 112 of light sensitive elements 114. More specifically, each light propagating unit 120a, 120b is arranged such that the distributing end 127 is facing at least two light sensitive elements 114. Thus, the light exiting the waveguide 125 at the distributing end 127 is incident onto the two light sensitive elements 114 of the array 112 of light sensitive elements 114.

In the present disclosure, the collecting ends 122 of the funnel elements 121 are arranged in a common plane parallel to the detector plane. For each light propagating unit 120a, 120b, the central funnel axis A1 is arranged to be perpendicular to the detector plane.

Each respective light sensitive element 114 is configured to generate an electric signal which is dependent on an intensity of the light incident onto the light sensitive element 114. Thus, the detector 110 may be an image detector such as charge-coupled devices (CCD) and complementary metal oxide semiconductors (CMOS). However, the detector 110 may alternatively be of another type.

For each light propagating unit 120a, 120b, the two light sensitive elements 114 onto which the light at the distributing end 127 is incident may be considered to form a sub-set 118 of light sensitive elements 114. Put differently, the plurality of light sensitive elements 114 may be divided into a plurality of sub-sets 118 of light sensitive elements 114.

The sub-sets 118 comprise an equal number of light sensitive elements 114, in the present example two light sensitive element 114. For each sub-set 118, the light sensitive elements 114 correspond to the light sensitive elements covered by the respective distributing end 127 of the light propagating unit 120a, 120b.

The distribution of the light at the distributing end 127 is dependent on wavelength of the received light. By way of example, the wavelengths of the light may be distributed by increasing wavelength from one edge of the distributing end 127 to an opposite edge of the distributing end 127, across the light sensitive elements 114 of the sub-set 118. However, also other types of distributions based on wavelength are conceivable.

It should be understood that although the sub-sets 118 are here illustrated to comprise only two light sensitive elements 114, the sub-sets 118 may alternatively comprise more light sensitive elements 114, such as three, four, five, six, or more light sensitive elements. Further, it should be understood that, although the sub-set 118 is here illustrated as comprising light sensitive elements 114 arranged along a single row, such as 1×2 light sensitive elements 114, the sub-sets 118 may alternatively comprise light sensitive elements 114 arranged in more than one row, such as 2×2, 2×3, 3×3, 3×4, 4×4, or more light sensitive elements 114.

Figure 1B:
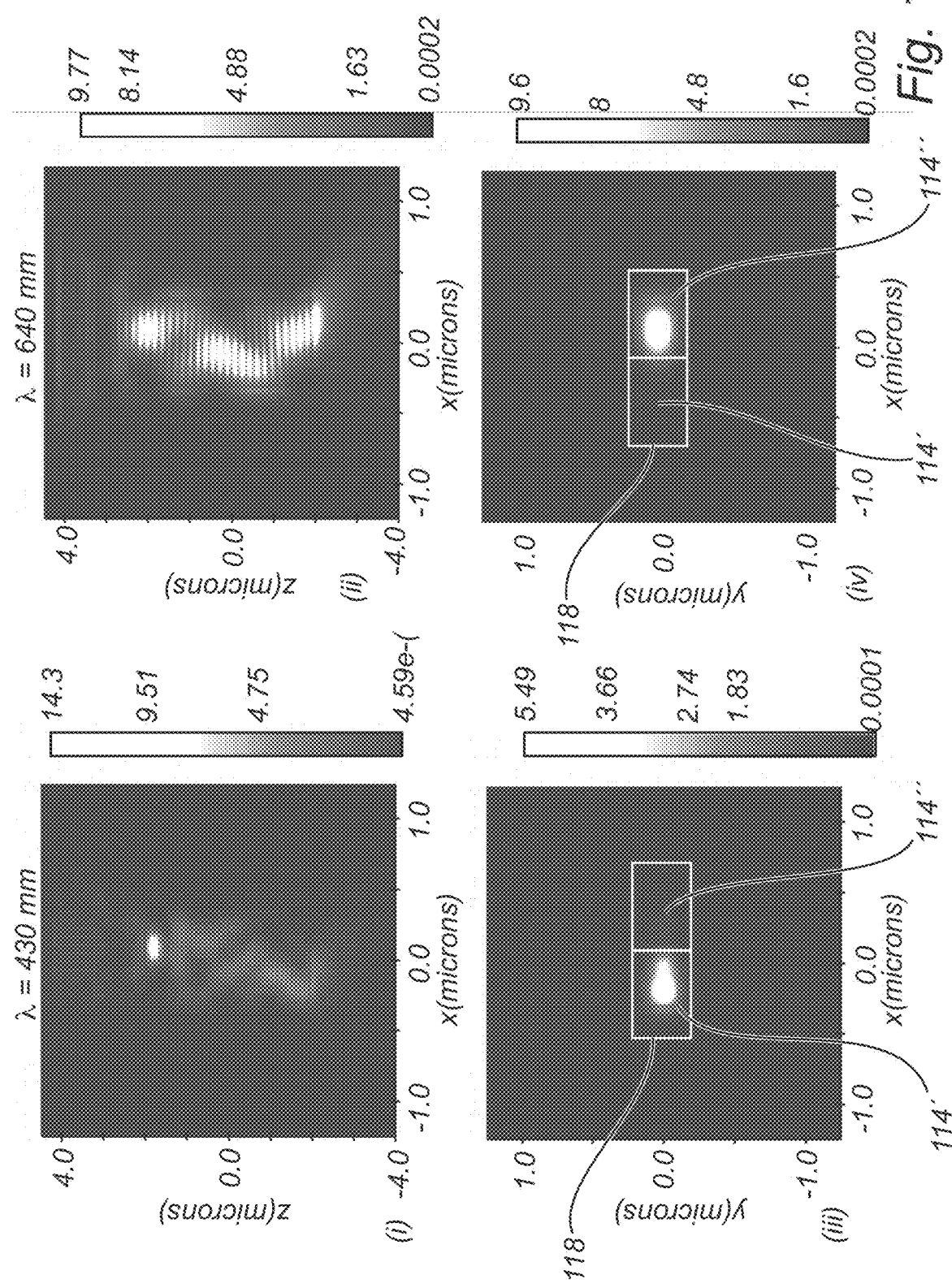
FIG. 1B illustrates how blue light and red light may be distributed in the waveguide according to an example embodiment.

FIG. 1B illustrates an example of how blue light (left column) and red light (right column) may be distributed in the waveguide, respectively. Light with a wavelength of 430 nm here represents blue light, and light with a wavelength of 640 nm here represents red light. However, it should be understood that the present description is by no means limited to these wavelengths. Rather light may be of any wavelengths within the visible, UV and IR part of the electromagnetic spectrum.

The top row illustrates a side view of the waveguide and how light at the respective wavelengths is distributed, as it propagates from the receiving end (upper part) to the distributing end (lower part).

The bottom row illustrates how light at the respective wavelengths is distributed at the distributing end, wherein the white rectangles represent the light sensitive elements 114', 114" onto which light from the distributing end is incident. By the present arrangement, a major portion of the blue (430 nm) light is incident onto light sensitive element 114', whereas a major portion of the red (640 nm) light is incident onto light sensitive element 114". Thus, the sub-set 118 of light sensitive elements 114', 114" of the imaging device 100 may be able to distinguish between blue and red light incident onto the light propagating unit.

Thus, in the present example, the waveguide is configured to propagate the light through the waveguide in dependence of wavelength such that the light at the distributing end is distributed into two wavelength bands linearly distributed along the distributing end. Each of the two wavelength bands is associated with a mutually unique light sensitive element 114', 114" of the two light sensitive elements. Further, the wavelength bands are ordered along the distributing end in a descending manner with respect to wavelength, from right to left in FIG. 1B.

Figure 2B:
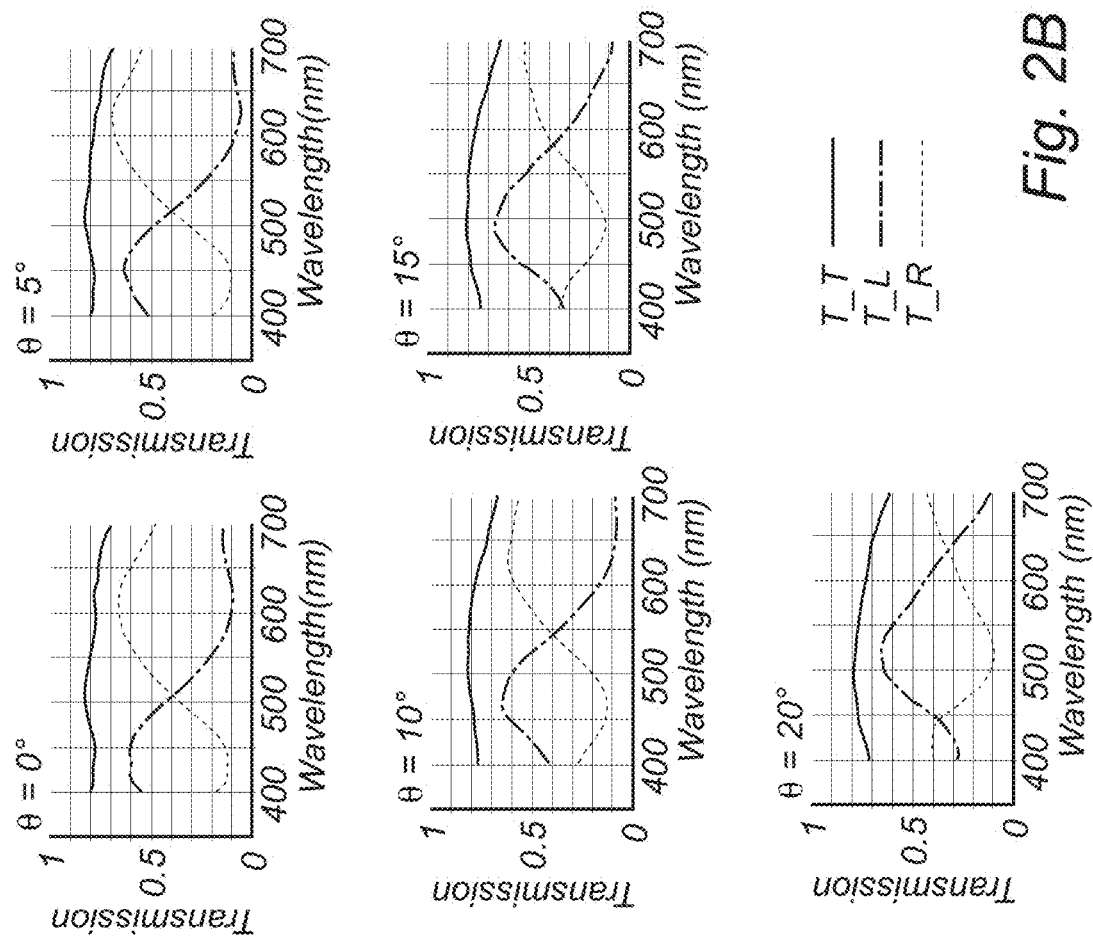
FIG. 2B illustrates transmission of light as a function of wavelength of the light received at two light sensitive elements, at a number of different angles of incidence according to an example embodiment.
Figure 2A:
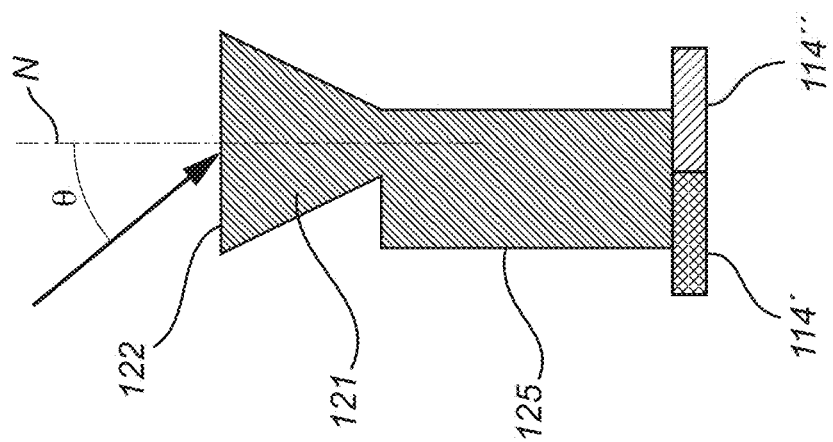
FIG. 2A illustrates light, with an angle of incidence with respect to the normal of the collecting end of the funnel element, being collected by a light propagating unit according to an example embodiment.

It is an insight of the present description that the propagation of light through the waveguide may be dependent on the angle of incidence of the light. FIGS. 2A and 2B illustrate the effect of such a dependance.

FIG. 2A illustrates light with an angle of incidence θ with respect to the normal N of the collecting end 122 of the funnel element 121. The light propagating unit is a first light propagating unit 120*a*. The first light propagating unit 120*a* has a first asymmetric coupling configured for efficient propagation and distribution of light collected at normal incidence (θ=0°) to the collecting end 122.

FIG. 2B illustrates transmission of light as a function of wavelength of the light received at the two light sensitive elements 114', 114", at a number of different angles of incidence. The curve denoted TL represents the light received at light sensitive element 114', and the curve denoted TR represents the light received at light sensitive element 114".

It is illustrated that, for normal incidence, the major portion of the light received at light sensitive element 114' has a wavelength below 500 nm with a peak at about 450 nm. By way of example, such a wavelength band may be considered to represent blue light. Further, for normal incidence, the major portion of the light received at light sensitive element 114" has a wavelength above 500 nm with a peak at about 600 nm. By way of example, such a wavelength band may be considered to represent red light. As illustrated in FIG. 2B, the light distribution provided at normal incidence is largely maintained also at an angle of incidence of θ=5° and θ=10°. A minor shift of the respective curves may be seen, but the light transmission and distribution may still be efficient. Thus, within a range of angle of incidence of θ=±10° with respect to the normal, the two light sensitive elements 114', 114" may be able to distinguish between the two wavelength bands, i.e. blue and red in the present example.

However, FIG. 2B further illustrates that at larger angles of incidence, such as θ=15° and θ=20°, the shift of the curves may be more pronounced, thus indicating that it may grow increasingly challenging to distinguish between the wavelength bands, with increasing angle of incidence. Hence, it is an insight of the present description that a light propagating unit having an asymmetric coupling configured for efficient propagation and distribution of light collected at normal incidence may not necessarily be optimal for efficient propagation and distribution of light collected at oblique angles. Rather, for oblique angles a different asymmetric coupling may provide a more efficient propagation and distribution of light. This will be discussed in relation to the following figures.

Figure 3:
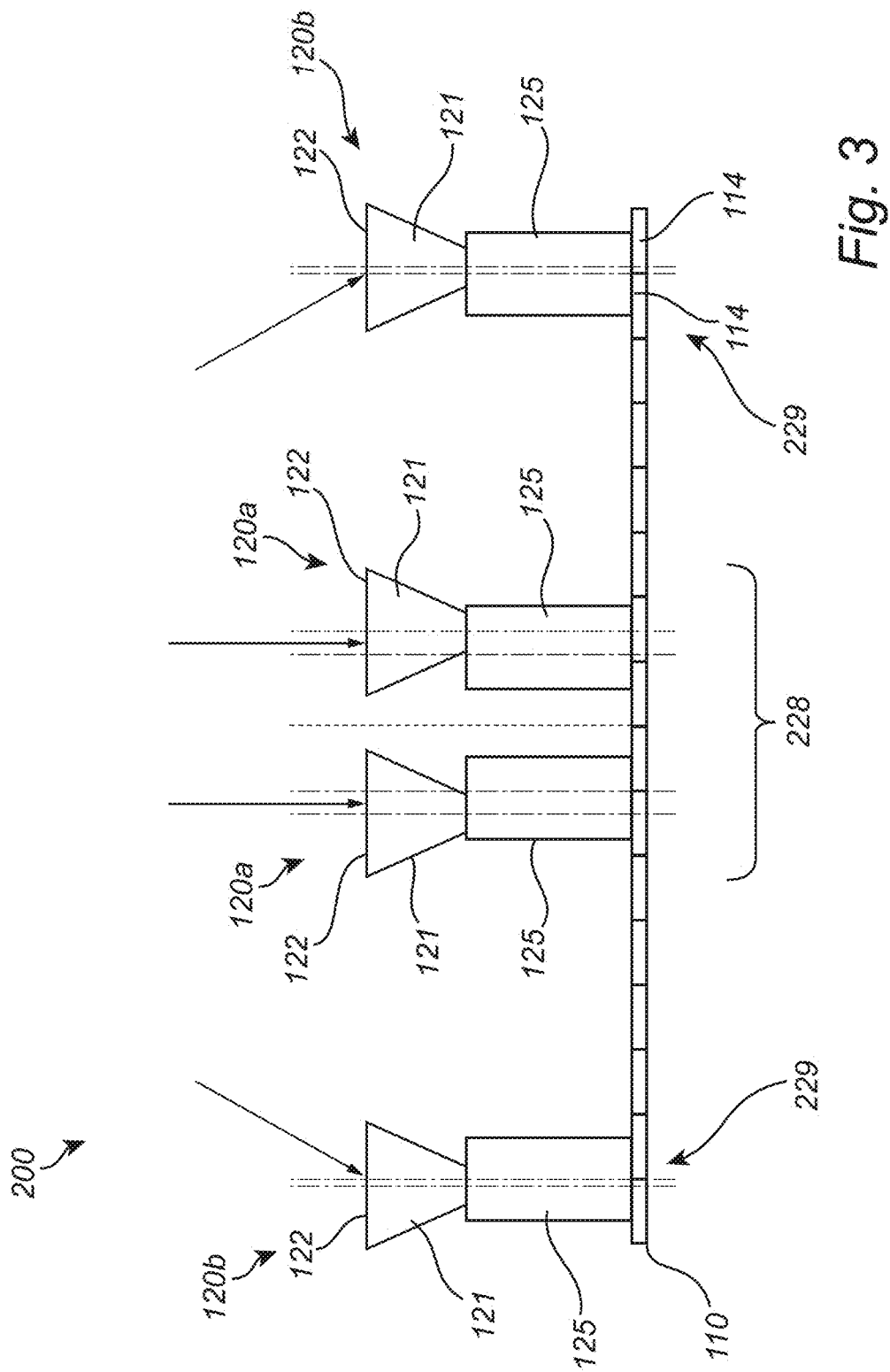
FIG. 3 illustrates an imaging device for wavelength dependent imaging, wherein the light propagating units are arranged in a central zone and a peripheral zone according to an example embodiment.

FIG. 3 illustrates an imaging device 200 for wavelength dependent imaging. The imaging device 200 comprises a plurality of light propagating units 120*a*, 120*b* arranged across a detector 110 comprising a plurality of light sensitive elements 114. The light propagating units 120*a*, 120*b* are of at least two different types, i.e. a first type and a second type, such that the plurality of light propagating units comprises at least a first light propagating unit 120*a* and a second light propagating unit 120*b*. Imaging device 200 shares some of the features with imaging device 100 described in relation to FIG. 1A-1B, the details of which are not repeated here.

In the present arrangement, when projecting an image of a scene onto the imaging device 200, light incident onto a central portion of the detector 110 is expected to have normal or close to normal incidence. By way of example, light incident onto a central portion of the detector 110 may be expected to have an angle of incidence in the interval of θ=±10°. Further, light incident onto a peripheral portion of the detector 110 is expected to have an oblique angle of incidence. By way of example, light incident onto a peripheral portion of the detector 110 may be expected to have an angle of incidence larger than ±10°.

The plurality of light propagating units 120*a*, 120*b* is arranged in a central zone 228 arranged at a central portion of the detector 110, and a peripheral zone 229 arranged at a peripheral portion of the detector (e.g., imaging device 100).

For light propagating units 120*a* arranged in the central zone 228, the funnel element 121 and the waveguide 125 have the first asymmetric coupling. For light propagating units 120*b* arranged in the peripheral zone 229, the funnel element 121 and the waveguide 125 have the second asymmetric coupling. In the present arrangement, the first displacement is larger than the second displacement. The light propagating units 120*a* having the first asymmetric coupling are configured for efficient propagation and distribution of light collected at normal incidence to the collecting end 122. The light propagating units 120*b* having the second asymmetric coupling with a second displacement, smaller than the first displacement, between the funnel element 121 and the waveguide 125, are configured for efficient propagation and distribution of light collected at oblique angles of incidence to the collecting end 122.

By the present arrangement, the imaging device 200 may be configured to receive light incident with a different angle of incidence onto different light propagating units 120*a*, 120*b* of the plurality of light propagating units 120*a*, 120*b*, depending on their location on the detector 110. Since the different light propagating units 120*a*, 120*b* are arranged with different asymmetric coupling of the funnel element 121 to the waveguide 125 depending on their location on the detector 110, propagation of the light in the waveguides 125 may be compensated for the angle of incidence. In the manner described above, an imaging device 200 for wavelength dependent imaging with a more uniform sensitivity and light distributing performance across the detector 110 may be provided.

In FIG. 3 a gap is illustrated between the central zone 228 and the peripheral zone 229. However, it should be understood that in the imaging device 200 also this region is provided with light propagating units. It is conceivable that the central zone 228 and or the peripheral zone are expanded such that the gap is eliminated. By way of example, the gap may comprise light propagating units 120*a* having the first asymmetric coupling, or the gap may comprise light propagating units 120*b* having the second asymmetric coupling, or the gap may comprise a combination thereof. As yet another alternative, the gap may represent an intermediate zone comprising light propagating units having an asymmetric coupling different from the first and second asymmetric couplings, as will be discussed in relation to the following figure.

Figure 4A:
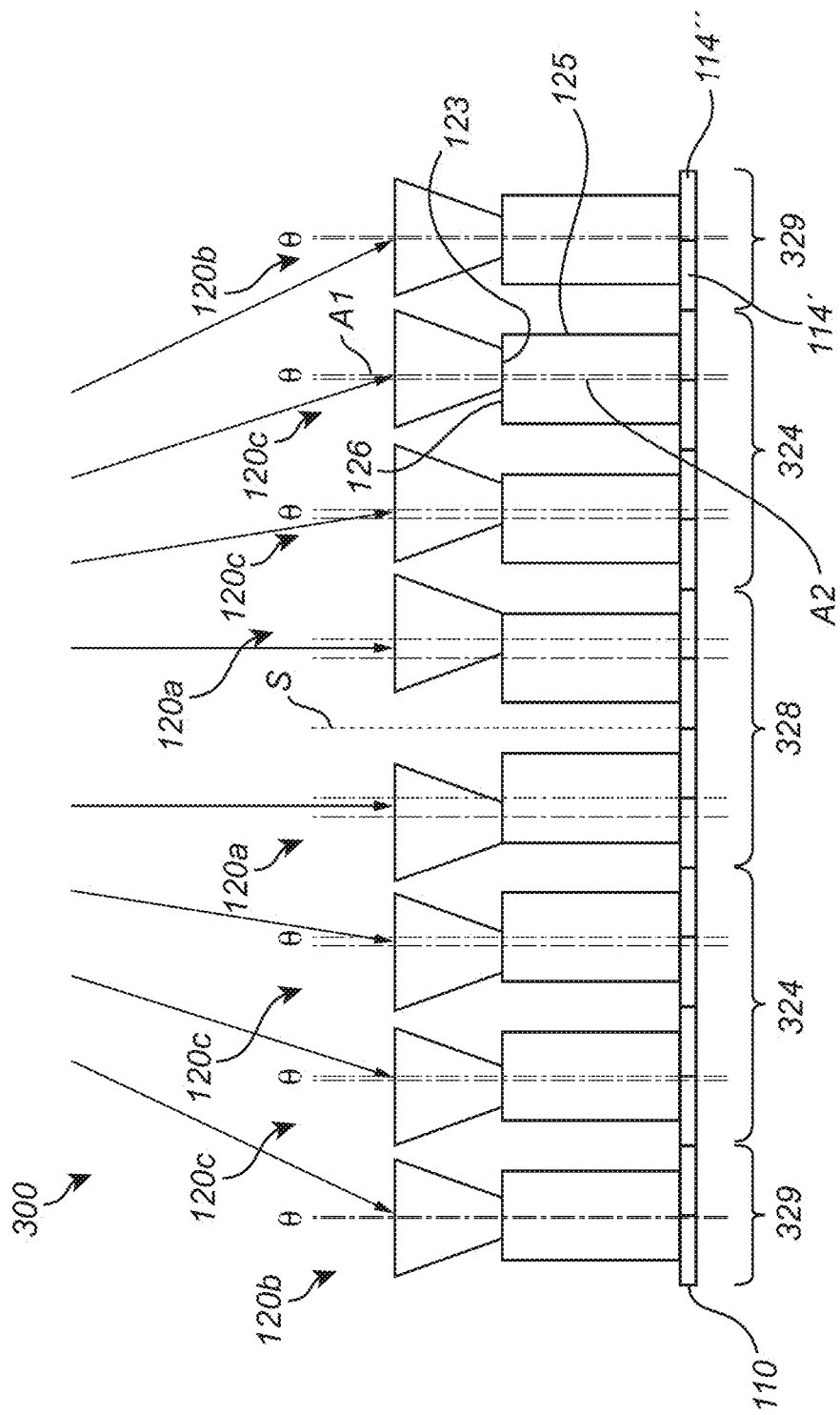
FIG. 4A illustrates an imaging device for wavelength dependent imaging, wherein the asymmetric coupling gradually transitions from a first asymmetric coupling in the central zone to a second asymmetric coupling in the peripheral zone according to an example embodiment.

FIG. 4A illustrates an imaging device 300 for wavelength dependent imaging. The imaging device 300 comprises a plurality of light propagating units 120*a*, 120*b*, 120*c* arranged across a detector 110 comprising a plurality of light sensitive elements 114. The light propagating units 120*a* of a central zone 328 are of the first type, and the light propagating units 120*b* of a peripheral zone 329 are of the second type. Imaging device 300 shares some of the features with imaging device 100 described in relation to FIGS. 1A-1B, and with imaging device 200 described in relation to FIG. 3, the details of which are not repeated here.

The plurality of light propagating units 120*a*, 120*b*, 120*c* is further arranged in an intermediate zone 324. The intermediate zone 324 is arranged between the central zone 328 and the peripheral zone 329. For light propagating units 120*c* arranged in the intermediate zone, a size of a displacement of the central funnel axis A1 at the transmitting end 123 with respect to the central waveguide axis A2 at the receiving end 126 gradually transitions from the first displacement towards the second displacement with decreasing size of the displacement from the central zone 328, through the intermediate zone 324 towards the peripheral zone 329.

By the present arrangement, the imaging device 300 may be configured to receive light with normal incidence at the central portion of the detector 110 and with increasing angle incidence with increasing distance from the central portion. The different light propagating units 120*a*, 120*b*, 120*c* are arranged with gradually transitioning asymmetric coupling from the central portion towards the peripheral portion so as to compensate the propagation of the light in the waveguides 125 for the difference in angle of incidence across the detector 110. In the manner described above, an imaging device 300 for wavelength dependent imaging with an even more uniform sensitivity and light distributing performance across the detector 110 may be provided.

It should be understood that, in FIG. 4A the plurality of light propagating units 120*a*, 120*b*, 120*c* is arranged to present a symmetry axis S. The asymmetric coupling of the light propagating units 120*a*, 120*b*, 120*c* on a first side of the symmetry axis S, is mirrored with respect to the asymmetric coupling of the light propagating units 120*a*, 120*b*, 120*c* on an opposite second side of the symmetry axis S. In the present example, light is expected to have normal incidence at the central portion of the detector, and to have an increasing angle of incidence with increasing distance from the central portion of the detector. However, the angle of incidence may have opposite direction at the first and second sides of the symmetry axis S. In other words, the angle of incidence may be mirrored with respect to the symmetry axis S. Thus, in order to provide substantially the same compensation for angle of incidence on the first and second sides of the symmetry axis S, the light propagating units 120*a*, 120*b*, 120*c* may also be mirrored.

It should be understood that, mirroring the light propagating units 120*a*, 120*b*, 120*c* with respect to the symmetry axis S may also mirror the order of the wavelength bands detected by the respective light sensitive elements 114. Thus, it is conceivable that if the light propagating units 120*a*, 120*b*, 120*c* on the first side of the symmetry axis S distribute the wavelength bands in descending order in a given direction, then the light propagating units 120*a*, 120*b*, 120*c* on the second side of the symmetry axis S may distribute the wavelength bands in ascending order in the same direction.

It serves to mention that, although only one symmetry axis S is illustrated in FIG. 4A, an imaging device may have more than one symmetry axis, such as two symmetry axes. A symmetry axis may be arranged to extend in parallel with a side of the detector 110. Alternatively, a symmetry axis may be arranged to extend along a diagonal of the detector 110, i.e. extending from a corner of the detector 110 to an opposite corner of the detector 110.

Figure 4B:
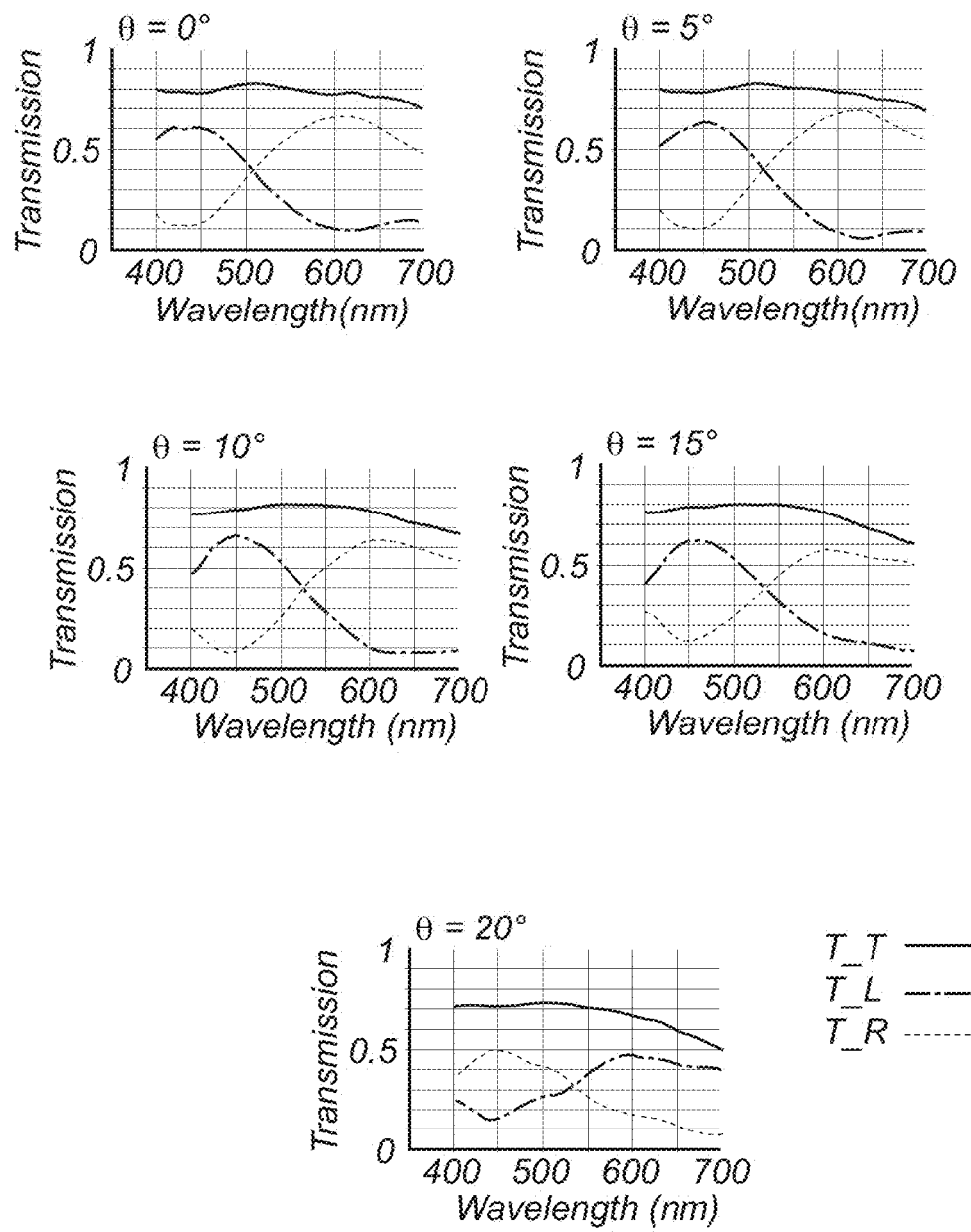
FIG. 4B illustrates transmission of light as a function of wavelength of the light received at the respective light sensitive elements of the imaging device, at a number of different light propagating units across the detector receiving a number of different angles of incidence according to an example embodiment.

FIG. 4B illustrates transmission of light as a function of wavelength of the light received at the respective light sensitive elements 114', 114" of the imaging device 300, at a number of different light propagating units 120*a*, 120*b*, 120*c* across the detector 110 receiving a number of different angles of incidence. The curve denoted TL represents the light received at a light sensitive element 114', and the curve denoted TR represents the light received at a light sensitive element 114".

It is illustrated that, for normal incidence, the major portion of the light received at light sensitive element 114' has a wavelength below 500 nm with a peak at about 450 nm (blue). Further, for normal incidence, the major portion of the light received at light sensitive element 114" has a wavelength above 500 nm with a peak at about 600 nm (red). As illustrated in FIG. 4B, the light distribution provided at normal incidence is largely maintained at light propagating units receiving angles of incidence of $\theta=5°$, $\theta=10°$, $\theta=15°$, and $\theta=20°$. Similarly to the illustration of FIG. 2B, a minor shift of the respective curves may be seen in FIG. 4B as well, but the light transmission and distribution may still be efficient. Thus, the imaging device 300 may in the manner described above provide compensation of propagation of light in the waveguides for angle of incidence of the light. By the present arrangement, the light sensitive elements 114', 114" are able to distinguish between the two wavelength bands, i.e. blue and red in the present example, within a range of angle of incidence of at least $\theta=\pm20°$ with respect to the normal. It should be understood however, that the range of angle of incidence for which any of the imaging devices 100, 200, 300 may be compensated for may extend beyond $\theta=\pm20°$, and by for example be $\theta=\pm30°$, $\theta=\pm40°$, $\theta=\pm50°$, or $\theta=\pm60°$ or more.

Figure 5:
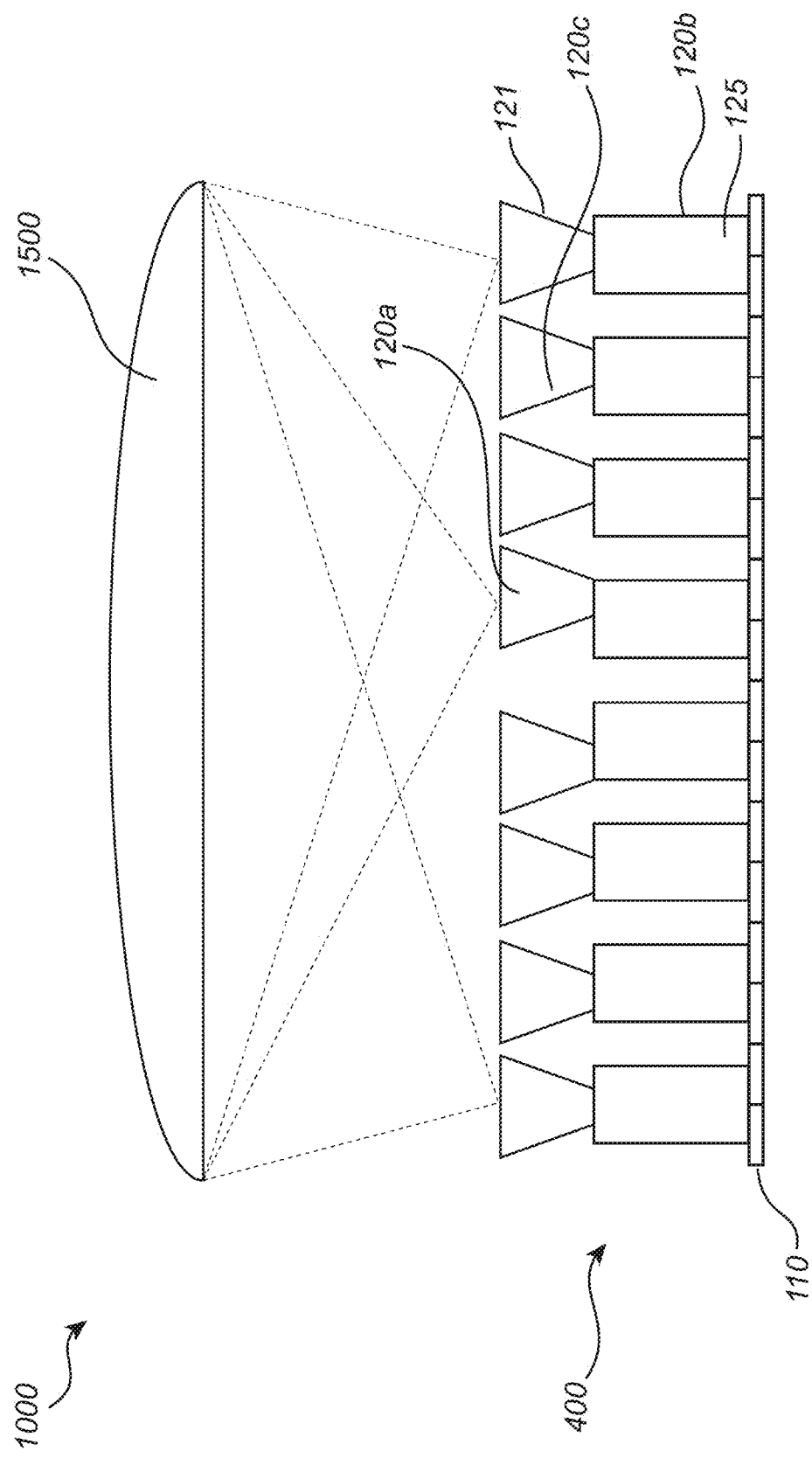
FIG. 5 schematically illustrates an imaging system for wavelength dependent imaging, comprising an imaging device and an objective lens according to an example embodiment.

FIG. 5 schematically illustrates an imaging system 1000 for wavelength dependent imaging. The imaging system 1000 comprises an imaging device 400. Given as non-limiting examples, the imaging device 400 may be any one of the imaging devices 100, 200, 300 as previously described.

The imaging system 1000 further comprises an objective lens 1500. The objective lens 1500 is configured to project an image of a scene (not illustrated here) onto the plurality of light propagating units 120*a*, 120*b*, 120*c* of the imaging device 400. Dependent on the objective lens 1500, light from the scene may be incident with a different angle of incidence onto different light propagating units 120*a*, 120*b*, 120*c*, depending on the location on the detector 110 of the different light propagating units 120*a*, 120*b*, 120*c*. For the objective lens 1500, the angle of incidence at different locations of the detector 110 may be known. Thus, the imaging device 400 may be tailored to fit the objective lens 1500, such that the different light propagating units 120*a*, 120*b*, 120*c* are arranged with different asymmetric coupling of the funnel element 121 to the waveguide 125 depending on the location on the detector 110 of the different light propagating units 120*a*, 120*b*, 120*c*, so as to compensate propagation of the light in each waveguide 125 for the angle of incidence at the different locations across the detector 110. By the present arrangement, an imaging system with substantially the same wavelength dependence for propagation of the light through all light propagating units 120*a*, 120*b*, 120*c* may be provided.

Although not illustrated here, it serves to mention that any of the imaging devices 100, 200, 300, 400 illustrated above may optionally be further configured to propagate the light through the waveguide 125 in dependence of polarization such that a spatial distribution of the light at the distributing end is dependent on polarization of the light, in addition to being dependence on wavelength. By way of example, the light propagating units may distribute light in dependence of wavelength in one direction and may further distribute light in dependence of polarization in another, perpendicular direction. By way of further example, the distributing end may distribute light towards a sub-set of 2×2, 3×3, 4×4, or 5×5 or more light sensitive elements 114. In the manner presently described one spatial direction on the detector 110 may represent wavelength whereas another perpendicular direction may represent polarization of the incident light.

Figure 6:
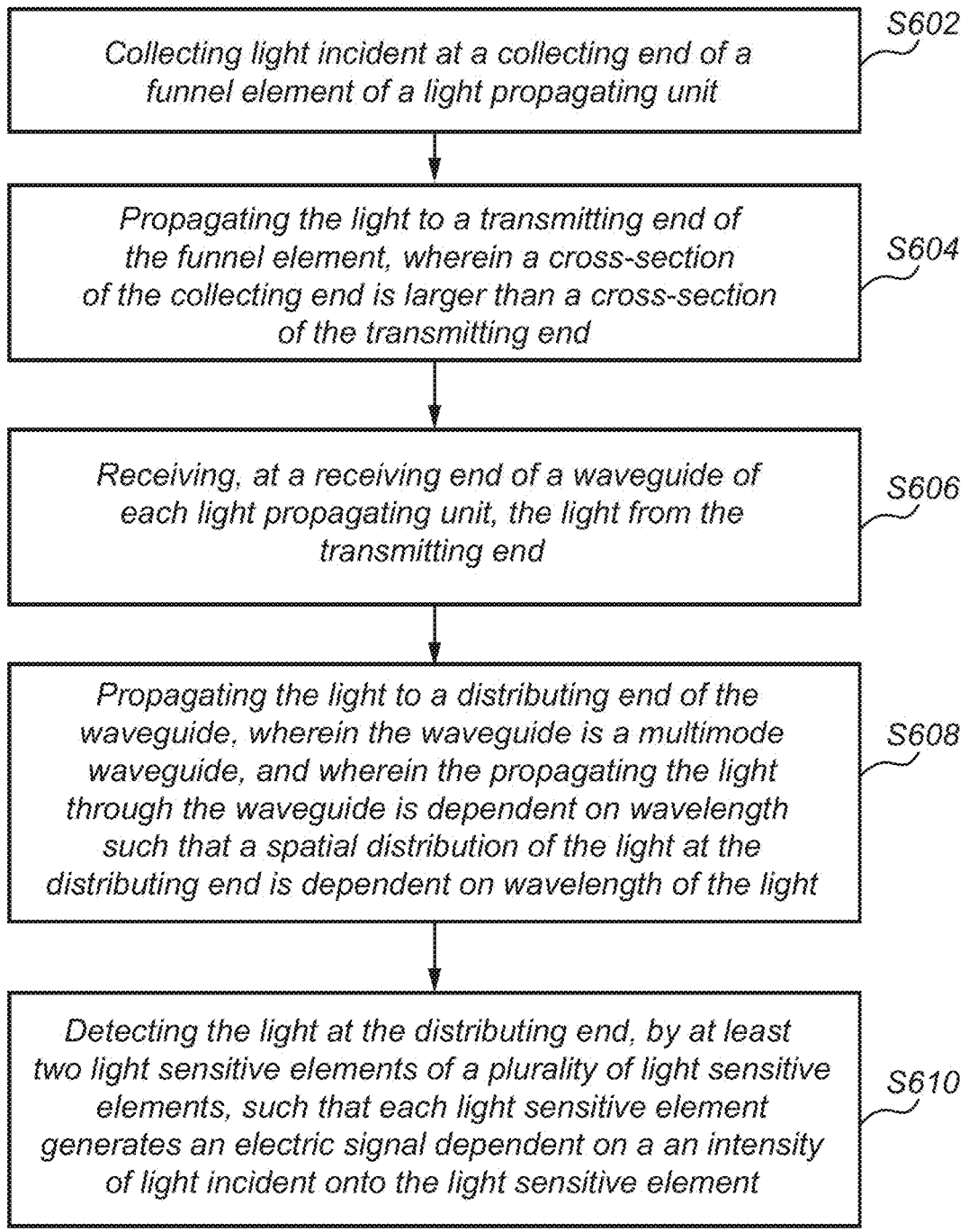
FIG. 6 illustrates a schematic block diagram shortly summarizing the method for wavelength dependent imaging according to an example embodiment.

FIG. 6 illustrates a schematic block diagram shortly summarizing the method for wavelength dependent imaging. It should be understood that the steps of the method, although listed in a specific order herein, may be performed in any order suitable.

The method may comprise collecting S602, by a plurality of light propagating units, light incident at a collecting end of a respective funnel element of each light propagating unit of the plurality of light propagating units.

The method may comprise propagating S604, for each light propagation unit, the light to a transmitting end of the funnel element, wherein a cross-section of the collecting end is larger than a cross-section of the transmitting end, and wherein the funnel element defines a central funnel axis extending from the collecting end to the transmitting end.

The method may comprise receiving S606, at a receiving end of a waveguide of each light propagating unit, the light from the transmitting end.

The method may comprise propagating S608, for each light propagation unit, the light to a distributing end of the waveguide, wherein the waveguide is a multimode waveguide, and wherein the propagating the light through the waveguide is dependent on wavelength such that a spatial distribution of the light at the distributing end is dependent on wavelength of the light, and wherein the waveguide defines a central waveguide axis extending from the receiving end to the distributing end. The propagating the light to a distributing end may further comprise distributing the light into at least two wavelength bands linearly distributed along the distributing end, wherein each of the at least two wavelength bands is associated with a mutually unique light sensitive element of the at least two light sensitive elements.

For a first light propagating unit the funnel element and the waveguide have a first asymmetric coupling such that the central funnel axis at the transmitting end has a first displacement with respect to the central waveguide axis at the receiving end, and for a second light propagating unit the funnel element and the waveguide have a second asymmetric coupling such that the central funnel axis at the transmitting end has a second displacement with respect to the central waveguide axis at the receiving end, wherein the second displacement is different from the first displacement.

The method may comprise detecting S610, for each light propagating unit, the light at the distributing end, by at least two light sensitive elements of a plurality of light sensitive elements, such that each light sensitive element generates an electric signal dependent on an intensity of light incident onto the light sensitive element.

The plurality of light propagating units may comprise at least a central zone arranged at a central portion of the detector, and a peripheral zone arranged at a peripheral portion of the detector.

For light propagating units of the central zone, the funnel element and the waveguide are asymmetrically coupled.

In the above the inventive concept has mainly been described with reference to a limited number of examples. However, as is readily appreciated by a person skilled in the art, other examples than the ones disclosed above are equally possible within the scope of the inventive concept, as defined by the appended claims.

What is claimed is:

1. An imaging device for wavelength dependent imaging, the imaging device comprising:
  a detector comprising a plurality of light sensitive elements, wherein each light sensitive element is configured to generate an electric signal dependent on an intensity of light incident onto the light sensitive element;
  a plurality of light propagating units, wherein each light propagating unit of the plurality of the light propagating units comprises:
    a funnel element having a collecting end and a transmitting end, and defining a central funnel axis extending from the collecting end to the transmitting end, the funnel element being configured to collect light incident at the collecting end and to propagate the light to the transmitting end, wherein a cross-section of the collecting end is larger than a cross-section of the transmitting end;
    a waveguide having a receiving end and a distributing end, and defining a central waveguide axis extending from the receiving end to the distributing end, the waveguide being configured to receive the light from the transmitting end at the receiving end and to propagate the light to the distributing end, wherein the waveguide is a multimode waveguide configured to propagate the light through the waveguide in dependence of wavelength such that a spatial distribution of the light at the distributing end is dependent on wavelength of the light;
  wherein, for a first light propagating unit, the funnel element and the waveguide have a first asymmetric coupling such that the central funnel axis at the transmitting end has a first displacement with respect to the central waveguide axis at the receiving end, and, for a second light propagating unit, the funnel element and the waveguide have a second asymmetric coupling such that the central funnel axis at the transmitting end has a second displacement with respect to the central waveguide axis at the receiving end, wherein the second displacement is different from the first displacement;
  wherein, for each light propagating unit, the light propagating unit is arranged with respect to the detector such that the light at the distributing end is incident onto at least two light sensitive elements of the plurality of light sensitive elements.

2. The imaging device according to claim 1, wherein the plurality of light sensitive elements is arranged in a planar fashion in a detector plane,
  wherein the collecting ends of the funnel elements of all light propagating units of the plurality of light propagating units are arranged in a common plane parallel to the detector plane, and
  wherein, for each light propagating unit, the central funnel axis is arranged to be perpendicular to the detector plane.

3. The imaging device according to claim 1, wherein, for each light propagating unit, the waveguide is configured to propagate the light through the waveguide in dependence of wavelength such that the light at the distributing end is distributed into at least two wavelength bands linearly distributed along the distributing end, and wherein each of the at least two wavelength bands is associated with a mutually unique light sensitive element of the at least two light sensitive elements.

4. The imaging device according to claim 3, wherein the plurality of light sensitive elements is arranged in a planar fashion in a detector plane,
wherein the collecting ends of the funnel elements of all light propagating units of the plurality of light propagating units are arranged in a common plane parallel to the detector plane, and
wherein, for each light propagating unit, the central funnel axis is arranged to be perpendicular to the detector plane.

5. The imaging device according to claim 3, wherein, for each light propagating unit, the wavelength bands are ordered along the distributing end in a descending manner with respect to wavelength.

6. The imaging device according to claim 5, wherein the plurality of light sensitive elements is arranged in a planar fashion in a detector plane,
wherein the collecting ends of the funnel elements of all light propagating units of the plurality of light propagating units are arranged in a common plane parallel to the detector plane, and
wherein, for each light propagating unit, the central funnel axis is arranged to be perpendicular to the detector plane.

7. The imaging device according to claim 6, wherein the plurality of light propagating units is arranged in at least a central zone arranged at a central portion of the detector, and a peripheral zone arranged at a peripheral portion of the detector,
wherein, for light propagating units arranged in the central zone, the funnel element and the waveguide have the first asymmetric coupling, and for light propagating units arranged in the peripheral zone, the funnel element and the waveguide have the second asymmetric coupling.

8. The imaging device according to claim 7, wherein the first displacement is larger than the second displacement.

9. The imaging device according to claim 1, wherein the plurality of light propagating units is arranged in at least a central zone arranged at a central portion of the detector, and a peripheral zone arranged at a peripheral portion of the detector,
wherein, for light propagating units arranged in the central zone, the funnel element and the waveguide have the first asymmetric coupling, and for light propagating units arranged in the peripheral zone, the funnel element and the waveguide have the second asymmetric coupling.

10. The imaging device according to claim 9, wherein the plurality of light propagating units is further arranged in one or more intermediate zones arranged between the central zone and the peripheral zone; and
wherein, for light propagating units arranged in the central zone, the one or more intermediate zones and the peripheral zone, a size of a displacement of the central funnel axis at the transmitting end with respect to the central waveguide axis at the receiving end gradually transitions from the first displacement for light propagating units arranged in the central zone towards the second displacement for light propagating units arranged in the peripheral zone with decreasing size of the displacement from the central zone, through the one or more intermediate zones towards the peripheral zone.

11. The imaging device according to claim 10, wherein the plurality of light propagating units is arranged to present a symmetry axis such that an asymmetric coupling of the light propagating units on a first side of the symmetry axis, is configured to be mirrored with respect to an asymmetric coupling of the light propagating units on a second side of the symmetry axis, the second side being opposite to the first side with respect to the symmetry axis.

12. The imaging device according to claim 1, wherein the plurality of light propagating units is arranged to present a symmetry axis such that an asymmetric coupling of the light propagating units on a first side of the symmetry axis, is configured to be mirrored with respect to an asymmetric coupling of the light propagating units on a second side of the symmetry axis, the second side being opposite to the first side with respect to the symmetry axis.

13. The imaging device according to claim 11, wherein, for each light propagating unit, the waveguide is further configured to propagate the light through the waveguide in dependence of polarization such that a spatial distribution of the light at the distributing end is dependent on wavelength and polarization of the light.

14. The imaging device according to claim 1, wherein, for each light propagating unit, the waveguide is further configured to propagate the light through the waveguide in dependence of polarization such that a spatial distribution of the light at the distributing end is dependent on wavelength and polarization of the light.

15. An imaging system comprising:
an imaging device according to claim 1;
an objective lens configured to project an image of a scene onto the plurality of light propagating units of the imaging device, wherein light from the scene is incident with a different angle of incidence onto different light propagating units of the plurality of light propagating units, depending on a location on the detector of the different light propagating units in relation to the objective lens;
wherein the different light propagating units are arranged with different asymmetric coupling of the funnel element to the waveguide depending on the location on the detector of the different light propagating units, so as to compensate propagation of the light in each waveguide for the angle of incidence.

16. A method for wavelength dependent imaging, the method comprising:
collecting, by a plurality of light propagating units, light incident at a collecting end of a respective funnel element of each light propagating unit of the plurality of light propagating units;
propagating, for each light propagation unit, the light to a transmitting end of the funnel element, wherein a cross-section of the collecting end is larger than a cross-section of the transmitting end, and wherein the funnel element defines a central funnel axis extending from the collecting end to the transmitting end;
receiving, at a receiving end of a waveguide of each light propagating unit, the light from the transmitting end;
propagating, for each light propagation unit, the light to a distributing end of the waveguide, wherein the waveguide is a multimode waveguide, and wherein the propagating the light through the waveguide is dependent on wavelength such that a spatial distribution of the light at the distributing end is dependent on wavelength of the light, and wherein the waveguide defines a central waveguide axis extending from the receiving end to the distributing end;

wherein for a first light propagating unit the funnel element and the waveguide have a first asymmetric coupling such that the central funnel axis at the transmitting end has a first displacement with respect to the central waveguide axis at the receiving end, and for a second light propagating unit the funnel element and the waveguide have a second asymmetric coupling such that the central funnel axis at the transmitting end has a second displacement with respect to the central waveguide axis at the receiving end, wherein the second displacement is different from the first displacement, and detecting, for each light propagating unit, the light at the distributing end, by at least two light sensitive elements of a plurality of light sensitive elements, such that each light sensitive element generates an electric signal dependent on an intensity of light incident onto the light sensitive element.

17. The method according to claim 16, wherein the propagating the light to a distributing end further comprises distributing the light into at least two wavelength bands linearly distributed along the distributing end, wherein each of the at least two wavelength bands is associated with a mutually unique light sensitive element of the at least two light sensitive elements.

18. The method according to claim 17, wherein the plurality of light propagating units comprises at least a central zone arranged at a central portion of a detector, and a peripheral zone arranged at a peripheral portion of the detector, and wherein, for light propagating units of the central zone, the funnel element and the waveguide are asymmetrically coupled.

19. The method according to claim 16, wherein the plurality of light propagating units comprises at least a central zone arranged at a central portion of the detector, and a peripheral zone arranged at a peripheral portion of the detector, and wherein, for light propagating units of the central zone, the funnel element and the waveguide are asymmetrically coupled.

* * * * *